(12) United States Patent
Baylark

(10) Patent No.: US 10,836,319 B1
(45) Date of Patent: Nov. 17, 2020

(54) VEHICLE MOUNTED IMAGING ASSEMBLY

(71) Applicant: Randolph Baylark, Chicago, IL (US)

(72) Inventor: Randolph Baylark, Chicago, IL (US)

( * ) Notice: Subject to any disclaimer, the term of this patent is extended or adjusted under 35 U.S.C. 154(b) by 0 days.

(21) Appl. No.: 16/728,069

(22) Filed: Dec. 27, 2019

(51) Int. Cl.
*H04N 7/18* (2006.01)
*B60R 1/12* (2006.01)
*H04N 5/225* (2006.01)

(52) U.S. Cl.
CPC .............. *B60R 1/12* (2013.01); *H04N 5/2252* (2013.01); *H04N 5/2257* (2013.01); *B60R 2001/1253* (2013.01)

(58) Field of Classification Search
CPC ....... B60R 1/12; H04N 5/2252; H04N 5/2257
USPC ............ 348/148, 149, 156, 153, 118, 208.14
See application file for complete search history.

(56) References Cited

U.S. PATENT DOCUMENTS

| | | |
|---|---|---|
| D388,107 S | 12/1997 | Huckins |
| 8,228,364 B2 | 7/2012 | Cilia |
| 8,854,465 B1 | 10/2014 | McIntyre |
| 9,041,803 B2 | 5/2015 | Chen |
| 9,319,639 B1 | 4/2016 | Englander |
| 9,911,253 B2 | 3/2018 | Plante |
| 2011/0304733 A1 | 12/2011 | Umoh |
| 2018/0367731 A1 | 12/2018 | Gatti |
| 2019/0347495 A1* | 11/2019 | Martin ...................... B60R 1/06 |

\* cited by examiner

*Primary Examiner* — Jefferey F Harold
*Assistant Examiner* — Jean W Desir

(57) ABSTRACT

A vehicle mounted imaging assembly for documenting events proximate to and within a vehicle includes a set of housings that is coupled to the vehicle. Each of a set of sensing, imaging, and transmitting modules is coupled to a respective housing and positioned in an associated interior space that is defined by the respective housing. The sensing, imaging, and transmitting module is configured to detect motion in, and selectively capture an image of, an area that is at least one of exterior to the vehicle and internal to the vehicle and to selectively transmit the image to an electronic device of a user.

11 Claims, 7 Drawing Sheets

VEHICLE MOUNTED IMAGING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to imaging assemblies and more particularly pertains to a new imaging assembly for documenting events proximate to and within a vehicle.

(2) Description of Related Art Including Information Disclosed Under 37 CFR 1.97 and 1.98

The prior art relates to imaging assemblies. Prior art imaging assemblies for vehicles may comprise an omnidirectional or panoramic camera, a camera mounted interiorly, a monitor, or a set of cameras mounted exteriorly.

BRIEF SUMMARY OF THE INVENTION

An embodiment of the disclosure meets the needs presented above by generally comprising a set of housings that is coupled to a vehicle. Each of a set of sensing, imaging, and transmitting modules is coupled to a respective housing and positioned in an associated interior space that is defined by the respective housing. The sensing, imaging, and transmitting module is configured to detect motion in, and selectively capture an image of, an area that is at least one of exterior to the vehicle and internal to the vehicle and to selectively transmit the image to an electronic device of a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
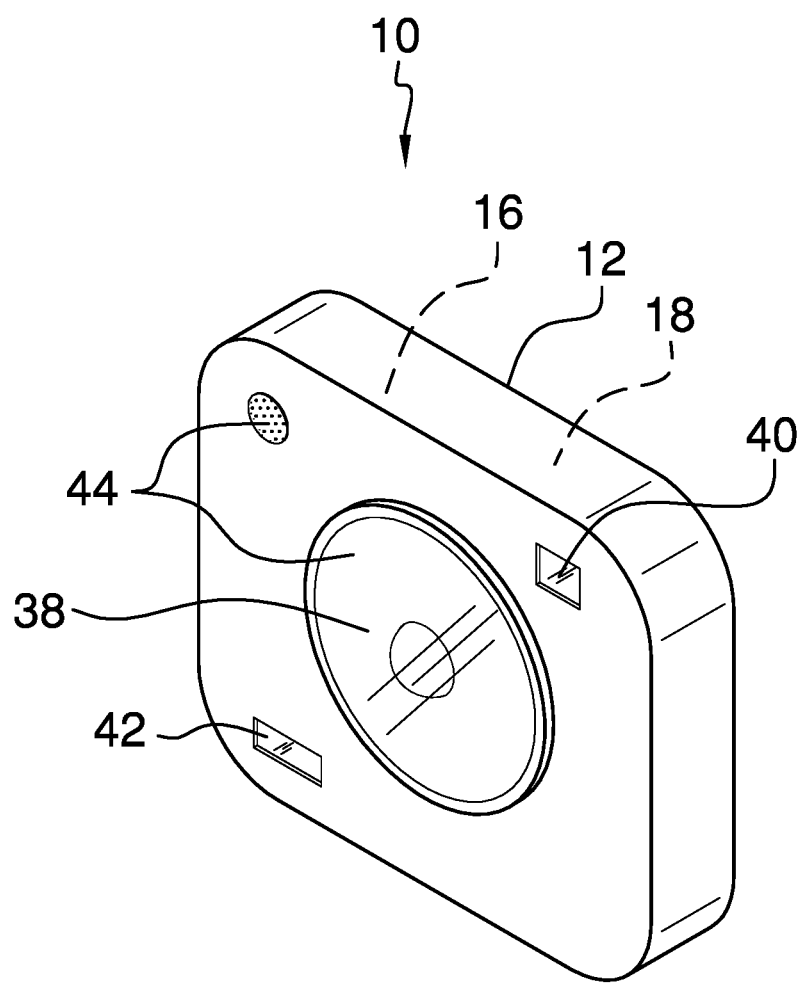
FIG. 1 is an isometric perspective view of a vehicle mounted imaging assembly according to an embodiment of the disclosure.

With reference now to the drawings, and in particular to FIGS. 1 through 7 thereof, a new imaging assembly embodying the principles and concepts of an embodiment of the disclosure and generally designated by the reference numeral 10 will be described.

As best illustrated in FIGS. 1 through 7, the vehicle mounted imaging assembly 10 generally comprises a set of housings 12 that is coupled to a vehicle 14. Each of a set of sensing, imaging, and transmitting modules 16 is coupled to a respective housing 12 and is positioned in an associated interior space 18 that is defined by the respective housing 12. The sensing, imaging, and transmitting module 16 is configured to detect motion in, and to selectively capture an image of, an area that is at least one of exterior to the vehicle 14 and internal to the vehicle 14 and to selectively transmit the image to an electronic device of a user. The present invention is anticipated to be useful in documenting a number of events for legal and security purposes, such as, but not limited to, vehicular accidents, vehicle theft and vandalism, road rage incidents, as well as altercations that might occur proximate to or within the vehicle 14.

Figure 2:
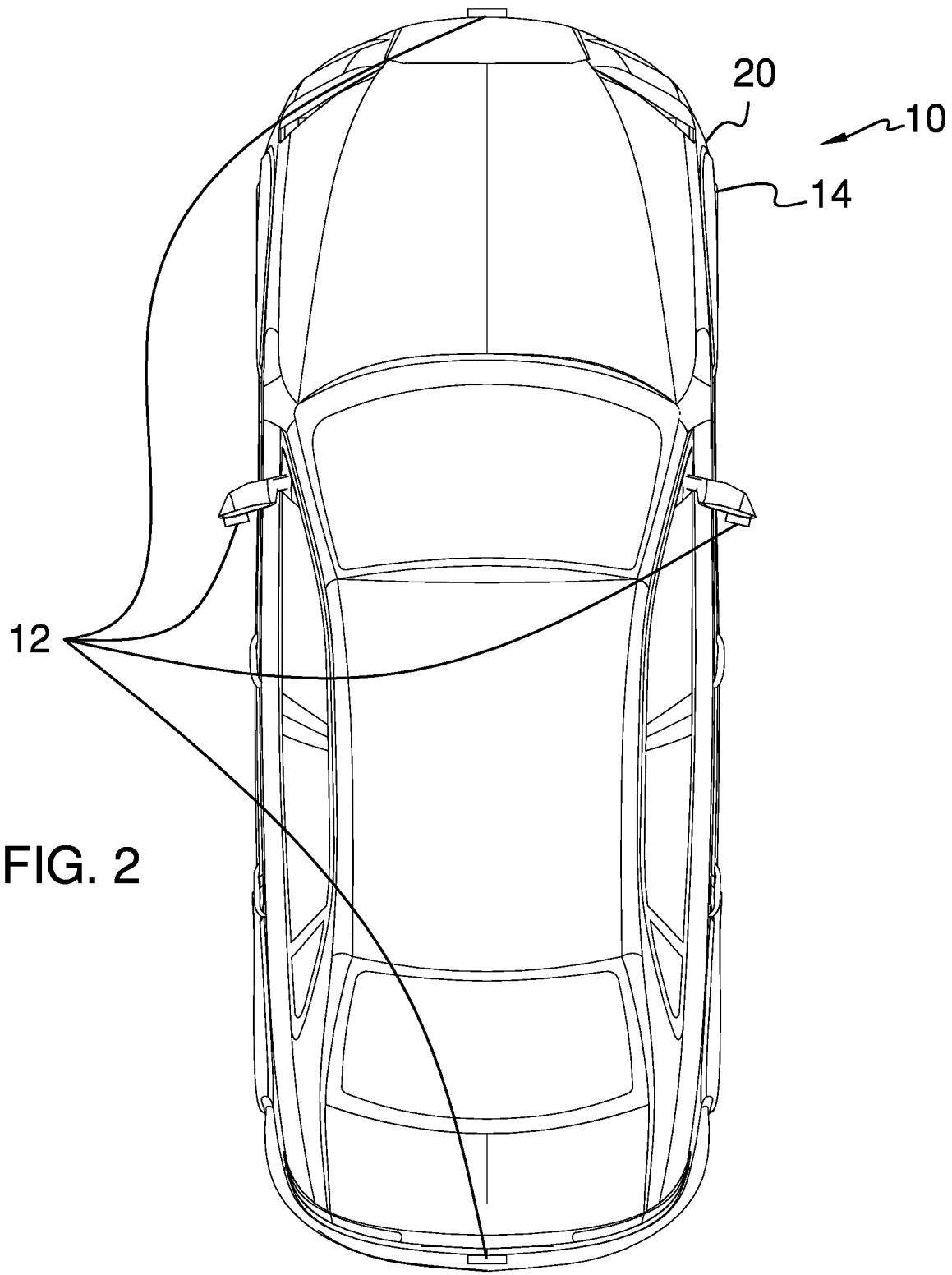
FIG. 2 is an in-use view of an embodiment of the disclosure.
Figure 3:
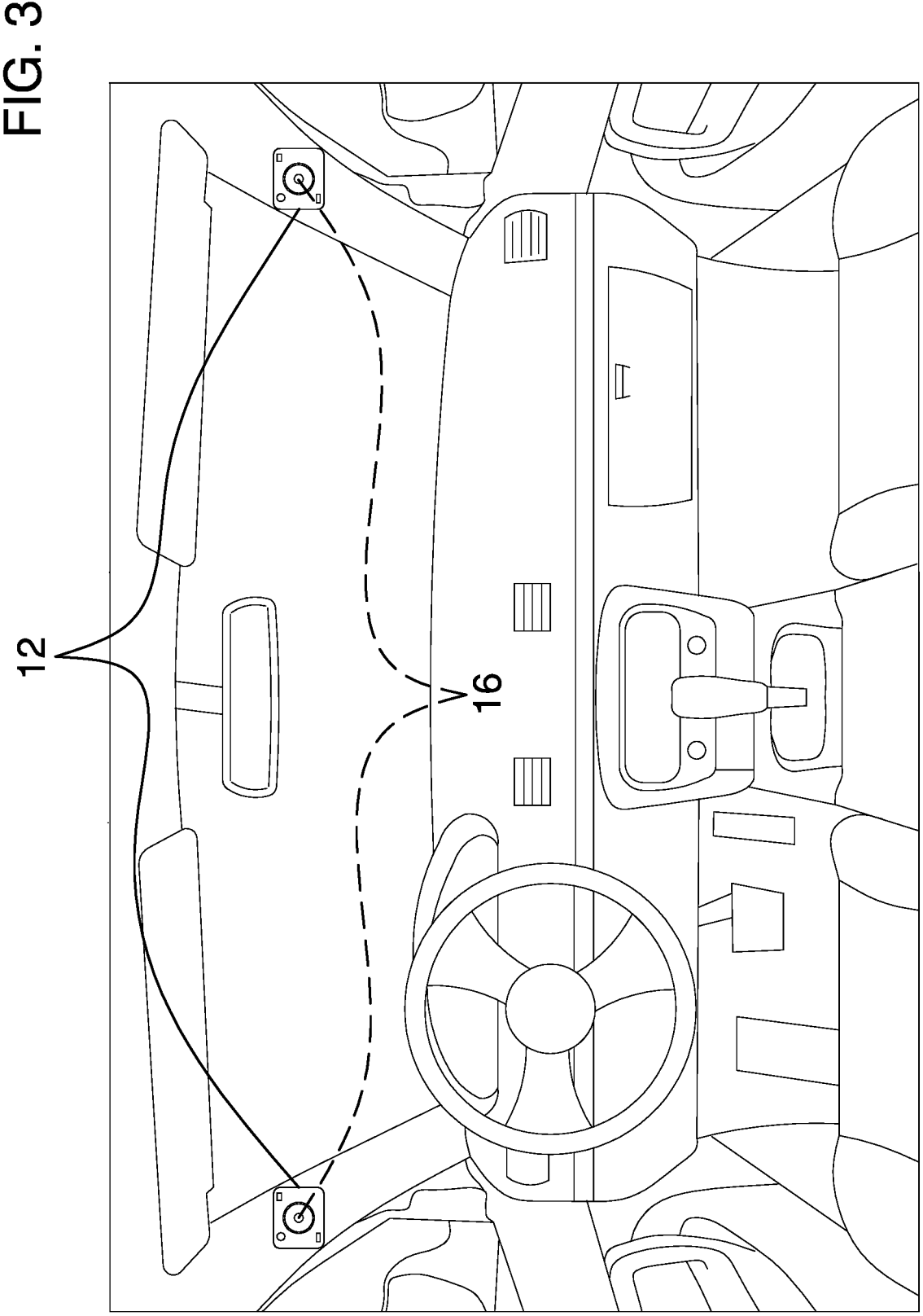
FIG. 3 is an in-use view of an embodiment of the disclosure.

As shown in FIGS. 2 and 3, the set of housings 12 may comprise a set of housings 12 that is coupled to an automobile 20, which comprises six housing 12 that are coupled singly to a front of the automobile 20, a rear of the automobile 20, a driver side mirror of the automobile 20, a passenger side mirror of the automobile 20, an interior surface of the automobile 20 proximate to a driver's seat of the automobile 20, and an interior surface of the automobile 20 proximate to a front passenger's seat of the automobile 20.

Figure 4:
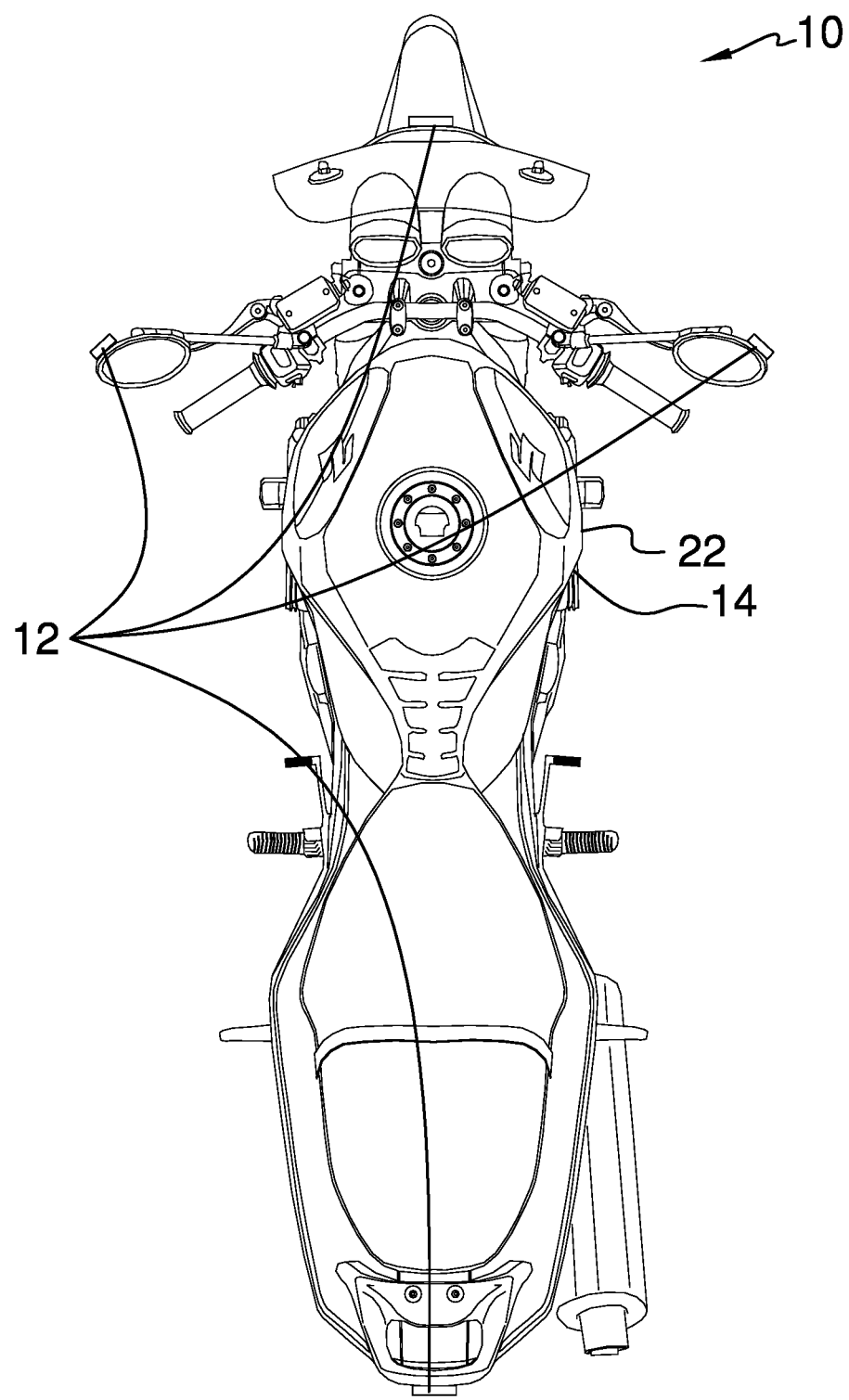
FIG. 4 is an in-use view of an embodiment of the disclosure.

As shown in FIG. 4, the set of housings 12 also may comprise a set of housings 12 that is coupled to a motorcycle 22, which comprises four housings 12 that are coupled singly to a front of the motorcycle 22, a rear of the motorcycle 22, a left side mirror of the motorcycle 22, and a right side mirror of the motorcycle 22.

Figure 5:
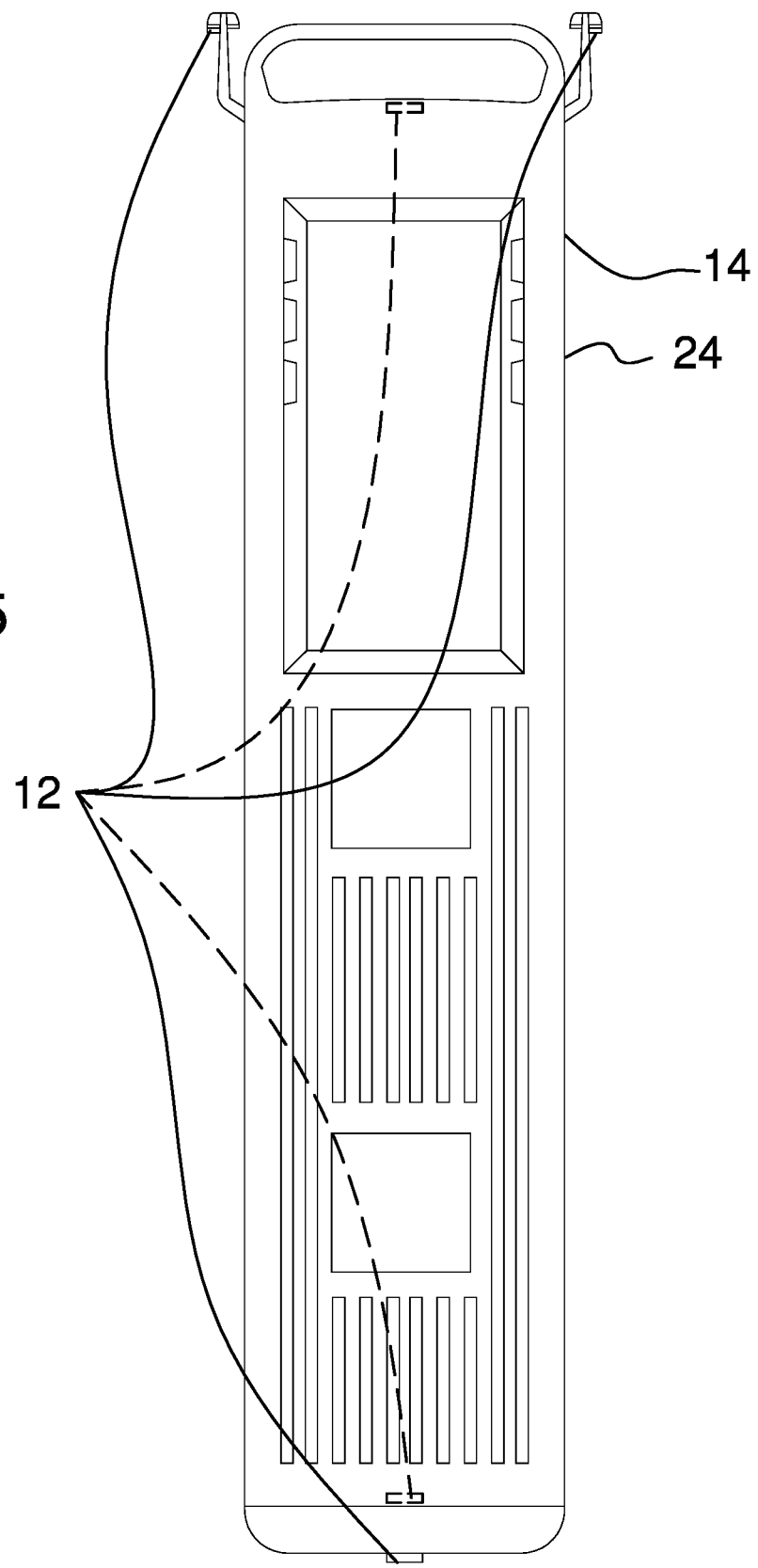
FIG. 5 is an in-use view of an embodiment of the disclosure.
Figure 6:
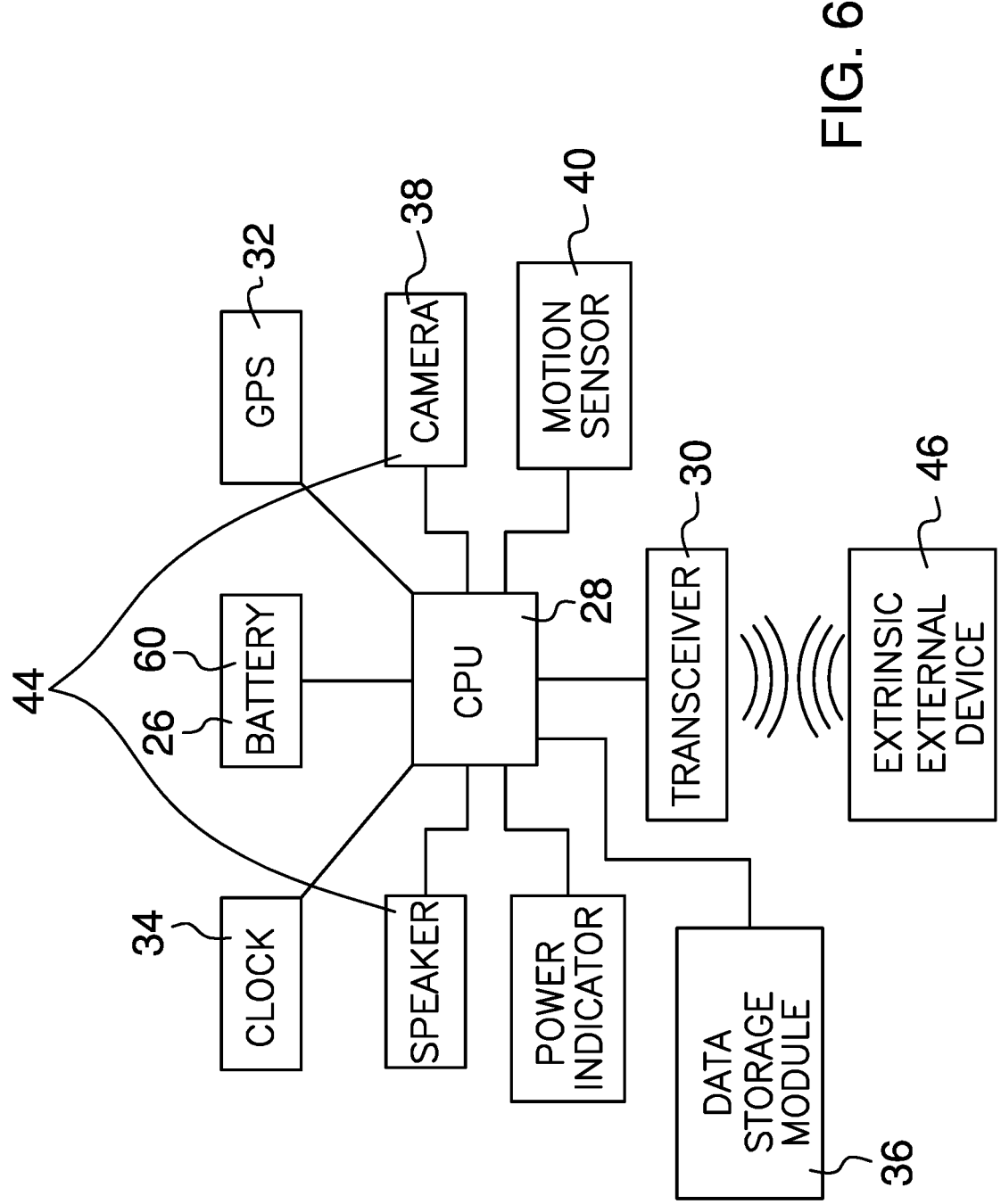
FIG. 6 is a block diagram view of an embodiment of the disclosure.
Figure 7:
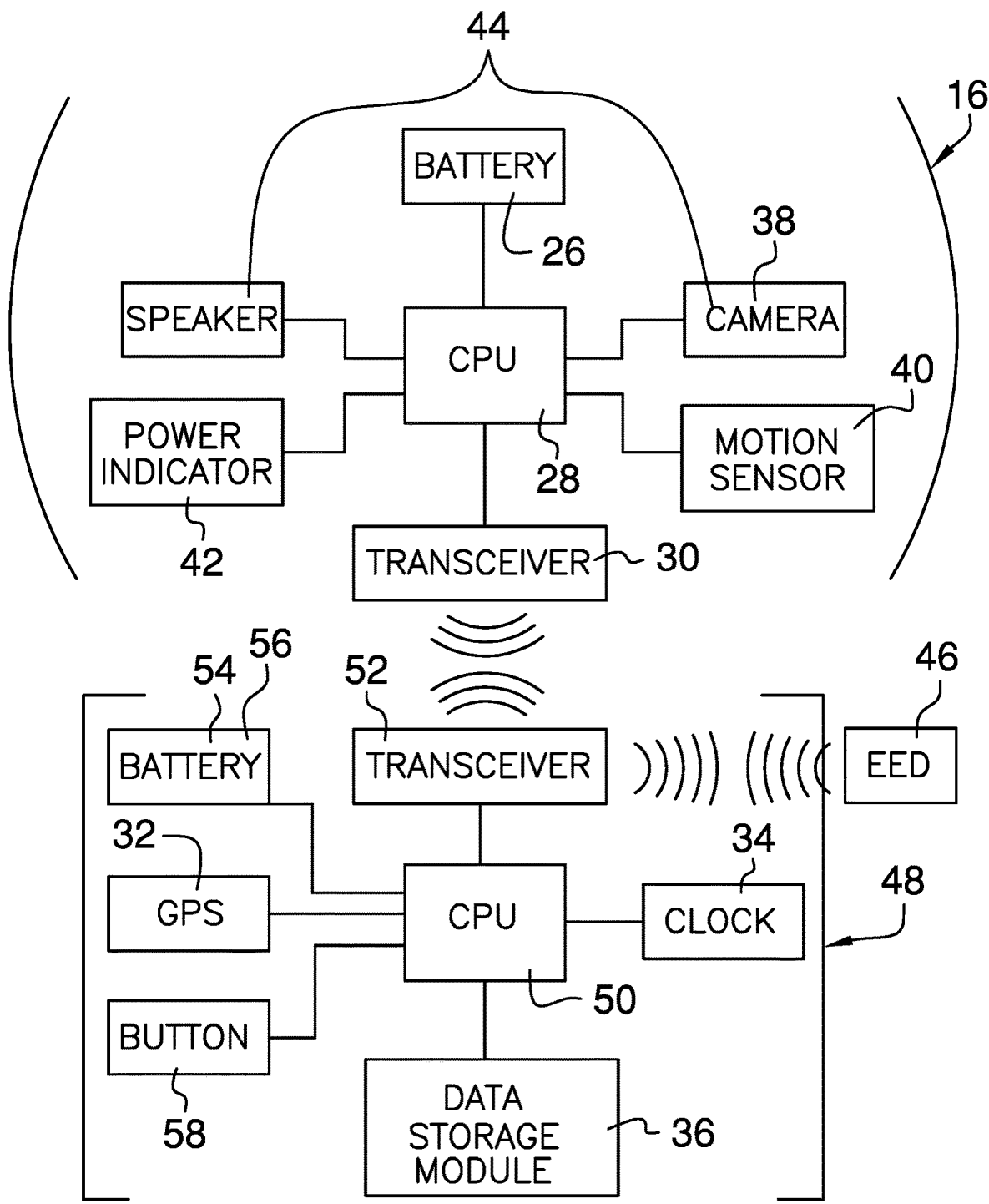
FIG. 7 is a block diagram view of an alternative embodiment of the disclosure.

As shown in FIG. 5, the set of housings 12 also may comprise set of housings 12 that is coupled to a bus 24, which comprises five housings 24 that coupled singly to a front of the bus 24, a rear of the bus 24, a left side mirror of the bus 24, and a right side mirror of the bus 24, an interior surface of the bus 24 proximate to the front of the bus 24 so that the housing 24 faces the rear of the bus 24, and an interior surface of the bus 24 proximate to the rear of the bus 24 so that the housing 24 faces the front of the bus 24.

Each sensing, imaging, and transmitting module 16 is coupled to a respective housing 12 and positioned in an associated interior space 18. Each sensing, imaging, and transmitting module 16 comprises a sensor power module 26, a sensor microprocessor 28, a module transceiver 30, a receiver 32, a clock 34, and a data storage module 36, each of which coupled to the respective housing 12 and positioned in the associated interior space 18. The sensor microprocessor 28 is operationally coupled to the sensor power module 26, the module transceiver 30, the receiver 32, the clock 34, and the data storage module 36. The sensor power module 26 comprises at least one of sensor battery 60 and an electrical circuit of the vehicle 14.

Each sensing, imaging, and transmitting module 16 also comprises an imager 38, a motion detector 40, and an indicator 42, each of which is coupled to the respective housing 12 and operationally coupled to the sensor microprocessor 28.

The sensor microprocessor 28 is positioned to actuate the imager 38 to capture the image of the area that is at least one of exterior to the vehicle 14 and internal to the vehicle 14. The data storage module 36 is positioned to store the image of the area that is at least one of exterior to the vehicle 14 and internal to the vehicle 14. The imager 38 comprises an audiovisual camera 44 that is configured to capture an audiovisual image of the image of the area that is at least one of exterior to the vehicle 14 and internal to the vehicle 14.

The motion detector 40 is configured to detect an object that is moving in the area that is at least one of exterior to the vehicle 14 and internal to the vehicle 14, positioning the sensor microprocessor 28 to actuate the imager 38 to capture an image of the object. The sensor microprocessor 28 also is positioned to actuate the module transceiver 30 to selectively transmit the image to the electronic device of the user.

The receiver 32 is Global Positioning System enabled and thus is configured to receive location coordinates of the vehicle 14, positioning the sensor microprocessor 28 to correlate the image with the location coordinates of the vehicle 14. The sensor microprocessor 28 also is positioned to time-stamp the image based on a time provided by the clock 34 and to selectively actuate the indicator 42 to indicate an active state of the sensing, imaging, and transmitting module 16.

The assembly 10 also comprises programming code 46 that is positioned on the electronic device of the user. The programming code 46 enables the user to selectively actuate the set of sensing, imaging, and transmitting modules 16.

In another embodiment of the invention, the assembly 10 comprise a control unit 48. The control unit 48 comprises a control microprocessor 50, a control transceiver 52, and a control power module 54. The clock 34, the receiver 32, and the data storage module 36 are components of the control unit 48. The control microprocessor 50 is operationally coupled to the control transceiver 52, the control power module 54, the clock 34, the receiver 32, and the data storage module 36. The control transceiver 52 is positioned to receive the image of the area that is at least one of exterior to the vehicle 14 and internal to the vehicle 14 from a respective sensing, imaging, and transmitting module 16 via an associated module transceiver 30. The control microprocessor 50 is positioned to actuate the data storage module 36, to store the image, and the control transceiver 52 to transmit the image to the electronic device of the user. The control power module 54 comprises at least one of a control battery 56 and an electrical circuit of the vehicle 14.

A button 58, which is depressible, is coupled to the control unit 48. The button 58 is operationally coupled to the control microprocessor 50 and is configured to be selectively depressed to actuate the set of sensing, imaging, and transmitting modules 16.

In use, the motion detector 40 signals the sensor microprocessor 28 when there is movement in the area that is at least one of exterior to the vehicle 14 and internal to the vehicle 14, positioning the sensor microprocessor 28 to actuate the imager 38 to capture an image of the object. The image is time-stamped and correlated with the location coordinates of the vehicle 14 and then sent to the electronic device of the user via the module transceiver 30, or the control transceiver 52 of the alternative embodiment.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle mounted imaging assembly comprising:
   a vehicle;
   a set of housings coupled to the vehicle, each housing defining an interior space; and
   a set of sensing, imaging, and transmitting modules, each sensing, imaging, and transmitting module being coupled to a respective housing and positioned in an associated interior space wherein the sensing, imaging, and transmitting module is configured for detecting motion in, and selectively capturing an image of, an area that is at least one of exterior to the vehicle and internal to the vehicle and for selectively transmitting the image to an electronic device of a user, each sensing, imaging, and transmitting module comprising
      a sensor power module coupled to the respective housing and positioned in the associated interior space,
      a sensor microprocessor coupled to the respective housing and positioned in the associated interior space, the sensor microprocessor being operationally coupled to the sensor power module, an imager coupled to the respective housing, the imager being operationally coupled to the sensor microprocessor such that the sensor microprocessor is positioned for actuating the imager for capturing the image of the area that is at least one of exterior to the vehicle and internal to the vehicle, a motion detector coupled to the respective housing, the motion detector being operationally coupled to the sensor microprocessor wherein the motion detector is configured for detecting an object moving in the area that is at least one of exterior to the vehicle and internal to the vehicle positioning the sensor microprocessor for actuating the imager for capturing an image of the object, and a module transceiver coupled to the respective housing and positioned in the associated interior space, the module transceiver being operationally coupled to the sensor microprocessor such that the sensor microprocessor is positioned for actuating the module transceiver for selectively transmitting the image to the electronic device of the user;

a receiver coupled to the respective housing and positioned in the associated interior space, the receiver being operationally coupled to the sensor microprocessor, the receiver being Global Positioning System enabled wherein the receiver is configured for receiving location coordinates of the vehicle positioning the sensor microprocessor for correlating the image with the location coordinates of the vehicle; and a clock coupled to the respective housing and positioned in the associated interior space, the clock being operationally coupled to the sensor microprocessor such that the sensor microprocessor is positioned for time-stamping the image.

2. The assembly of claim 1, further including the set of housings comprising at least one of:

a set of housings coupled to an automobile, the set of housings coupled to an automobile comprising six housing coupled singly to a front of the automobile, a rear of the automobile, a driver side mirror of the automobile, a passenger side mirror of the automobile, an interior surface of the automobile proximate to a driver's seat of the automobile, and an interior surface of the automobile proximate to a front passenger's seat of the automobile;

a set of housings coupled to a motorcycle, the set of housings coupled to a motorcycle comprising four housings coupled singly to a front of the motorcycle, a rear of the motorcycle, a left side mirror of the motorcycle, and a right side mirror of the motorcycle; and a set of housings coupled to a bus, the set of housings coupled to a bus comprising five housings coupled singly to a front of the bus, a rear of the bus, a left side mirror of the bus, and a right side mirror of the bus, an interior surface of the bus proximate to the front of the bus such that the housing faces the rear of the bus, and an interior surface of the bus proximate to the rear such that the housing faces the front of the bus.

3. The assembly of claim 1, further including the sensor power module comprising at least one of sensor battery and an electrical circuit of the vehicle.

4. The assembly of claim 1, further including the imager comprising an audiovisual camera wherein the audiovisual camera is configured for capturing an audiovisual image of the image of the area that is at least one of exterior to the vehicle and internal to the vehicle.

5. The assembly of claim 1, further including an indicator coupled to the respective housing, the indicator being operationally coupled to the sensor microprocessor such that the sensor microprocessor is positioned for selectively actuating the indicator for indicating an active state of the sensing, imaging, and transmitting module.

6. The assembly of claim 1, further including a data storage module coupled to the respective housing and positioned in the associated interior space, the data storage module being operationally coupled to the sensor microprocessor such that the data storage module is positioned for storing the image of the area that is at least one of exterior to the vehicle and internal to the vehicle.

7. The assembly of claim 1, further including programming code positioned on the electronic device of the user enabling the user for selectively actuating the set of sensing, imaging, and transmitting modules.

8. The assembly of claim 6, further including a control unit comprising a control microprocessor, a control transceiver, a control power module, the clock, the receiver, and the data storage module, the control microprocessor being operationally coupled to the control transceiver, the control power module, the clock, the receiver, and the data storage module such that the control transceiver is positioned for receiving the image of the area that is at least one of exterior to the vehicle and internal to the vehicle from a respective sensing, imaging, and transmitting module via an associated module transceiver positioning the control microprocessor for actuating the data storage module for storing the image and the control transceiver for transmitting the image to the electronic device of the user.

9. The assembly of claim 8, further including the control power module comprising at least one of a control battery and an electrical circuit of the vehicle.

10. The assembly of claim 8, further including a button coupled to the control unit, the button being depressible, the button being operationally coupled to the control microprocessor wherein the button is configured for selectively depressing for actuating the set of sensing, imaging, and transmitting modules.

11. A vehicle mounted imaging assembly comprising:

a vehicle;

a set of housings coupled to the vehicle, each housing defining an interior space, the set of housings comprising at least one of:

a set of housings coupled to an automobile, the set of housings coupled to an automobile comprising six housing coupled singly to a front of the automobile, a rear of the automobile, a driver side mirror of the automobile, a passenger side mirror of the automobile, an interior surface of the automobile proximate to a driver's seat of the automobile, and an interior surface of the automobile proximate to a front passenger's seat of the automobile, a set of housings coupled to a motorcycle, the set of housings coupled to a motorcycle comprising four housings coupled singly to a front of the motorcycle, a rear of the motorcycle, a left side mirror of the motorcycle, and a right side mirror of the motorcycle, and a set of housings coupled to a bus, the set of housings coupled to a bus comprising five housings coupled singly to a front of the bus, a rear of the bus, a left side mirror of the bus, and a right side mirror of the bus, an interior surface of the bus proximate to the front of the bus such that the housing faces the rear of the bus, and an interior surface of the bus proximate to the rear such that the housing faces the front of the bus;

a set of sensing, imaging, and transmitting modules, each sensing, imaging, and transmitting module being coupled to a respective housing and positioned in an associated interior space wherein the sensing, imaging, and transmitting module is configured for detecting motion in, and selectively capturing an image of, an area that is at least one of exterior to the vehicle and internal to the vehicle and for selectively transmitting the image to an electronic device of a user, each sensing, imaging, and transmitting module comprising:

a sensor power module coupled to the respective housing and positioned in the associated interior space, the sensor power module comprising at least one of sensor battery and an electrical circuit of the vehicle, a sensor microprocessor coupled to the respective housing and positioned in the associated interior space, the sensor microprocessor being operationally coupled to the sensor power module, an imager coupled to the respective housing, the imager being operationally coupled to the sensor microprocessor such that the sensor microprocessor is positioned for actuating the imager for capturing the image of the area that is at least one of exterior to the vehicle and internal to the vehicle, the imager comprising an audiovisual camera wherein the audiovisual camera is configured for capturing an audiovisual image of the image of the area that is at least one of exterior to the vehicle and internal to the vehicle, a motion detector coupled to the respective housing, the motion detector being operationally coupled to the sensor microprocessor wherein the motion detector is configured for detecting an object moving in the area that is at least one of exterior to the vehicle and internal to the vehicle positioning the sensor microprocessor for actuating the imager for capturing an image of the object, a module transceiver coupled to the respective housing and positioned in the associated interior space, the module transceiver being operationally coupled to the sensor microprocessor such that the sensor microprocessor is positioned for actuating the module transceiver for selectively transmitting the image to the electronic device of the user, a receiver coupled to the respective housing and positioned in the associated interior space, the receiver being operationally coupled to the sensor microprocessor, the receiver being Global Positioning System enabled wherein the receiver is configured for receiving location coordinates of the vehicle positioning the sensor microprocessor for correlating the image with the location coordinates of the vehicle, a clock coupled to the respective housing and positioned in the associated interior space, the clock being operationally coupled to the sensor microprocessor such that the sensor microprocessor is positioned for time-stamping the image, an indicator coupled to the respective housing, the indicator being operationally coupled to the sensor microprocessor such that the sensor microprocessor is positioned for selectively actuating the indicator for indicating an active state of the sensing, imaging, and transmitting module, and a data storage module coupled to the respective housing and positioned in the associated interior space, the data storage module being operationally coupled to the sensor microprocessor such that the data storage module is positioned for storing the image of the area that is at least one of exterior to the vehicle and internal to the vehicle;

programming code positioned on the electronic device of the user enabling the user for selectively actuating the set of sensing, imaging, and transmitting modules;

a control unit comprising a control microprocessor, a control transceiver, a control power module, the clock, the receiver, and the data storage module, the control microprocessor being operationally coupled to the control transceiver, the control power module, the clock, the receiver, and the data storage module such that the control transceiver is positioned for receiving the image of the area that is at least one of exterior to the vehicle and internal to the vehicle from a respective sensing, imaging, and transmitting module via an associated module transceiver positioning the control microprocessor for actuating the data storage module for storing the image and the control transceiver for transmitting the image to the electronic device of the user, the control power module comprising at least one of a control battery and an electrical circuit of the vehicle; and a button coupled to the control unit, the button being depressible, the button being operationally coupled to the control microprocessor wherein the button is configured for selectively depressing for actuating the set of sensing, imaging, and transmitting modules.

\* \* \* \* \*